(No Model.)

C. O. PARKHURST.
CORN PLANTER.

No. 454,601. Patented June 23, 1891.

Witnesses
Jas. K. McCathran
Wm. Bagger

Inventor
Charles O. Parkhurst
By his Attorneys,
C. A. Snow & Co.

UNITED STATES PATENT OFFICE.

CHARLES O. PARKHURST, OF TOPEKA, ILLINOIS.

CORN-PLANTER.

SPECIFICATION forming part of Letters Patent No. 454,601, dated June 23, 1891.

Application filed February 24, 1891. Serial No. 382,573. (No model.)

*To all whom it may concern:*

Be it known that I, CHARLES O. PARKHURST, a citizen of the United States, residing at Topeka, in the county of Mason and State of Illinois, have invented a new and useful Corn-Planter, of which the following is a specification.

This invention relates to corn-planters; and it has for its object to construct a planter in which the seed shall be fed evenly and constantly and without danger of becoming wedged in the seed-cups or perforations provided for the passage of the same.

My invention, which is especially applicable to that class of corn-planters which are provided with a rotary seed-disk, consists in the improved construction, arrangement, and combination of parts, which will be hereinafter fully described, and particularly pointed out in the claims.

Figure 1:
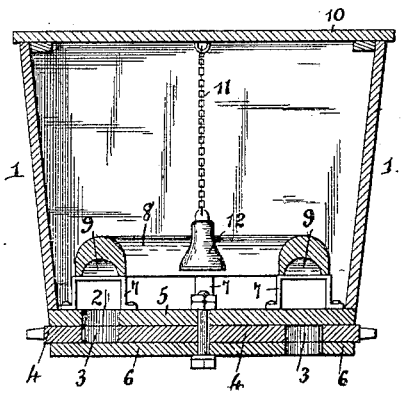
Figure 2:
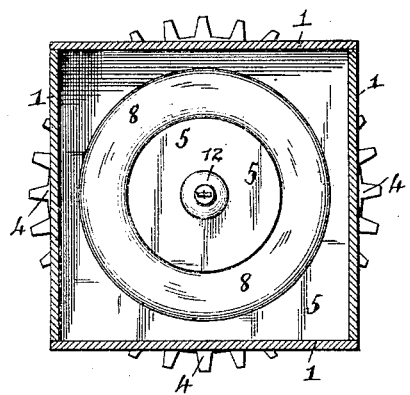
Figure 3:
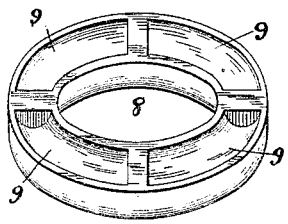

In the drawings hereto annexed, Figure 1 is a sectional view taken vertically through the hopper or seed-box of the planter equipped with my improvements. Fig. 2 is a horizontal sectional view. Fig. 3 is a perspective detail view of the seed-guide, showing the same in an inverted position.

Like numerals of reference indicate like parts in all the figures.

1 designates the hopper or seed-box, the bottom of which is provided with perforations 2 for the passage of seed into the seed-cups 3 of the revolving seed-disk 4, which is mounted between the bottom 5 of the hopper and a cut-off plate 6, arranged under the latter. The bottom of the hopper is provided with upwardly-extending brackets 7, supporting a ring 8, the under side of which has an annular concavity or recess 9.

10 designates the lid of the hopper, which is provided on its under side with a staple, to which is attached a chain 11, at the lower end of which is suspended a bell 12, which is adapted to engage the ring 8 when the hopper is sufficiently emptied to permit the said bell to have a swinging movement therein.

The operation of my invention will be readily understood. When seed is placed in the box or hopper, the bell will be packed in the same and will be held stationary. The guide-ring 8, which is supported a suitable distance above the bottom, serves to guide the seed to the perforations 2 in the latter, which said perforations are arranged in a circular series directly below the said guide-ring. The latter will thus serve to prevent the seeds from being wedged or packed in the said perforations, while, owing to the concavity or recess in the under side of said rings, the seeds are not prevented from entering the said perforations. When the seed-box is almost emptied, the bell 12 becomes liberated, and the motion of the machine will cause it to vibrate in the hopper, thus notifying the operator that the said hopper is almost empty and warning him to refill it in time to avoid danger of missing any hills.

The general construction of the device is very simple and inexpensive, and it is of such a nature as to enable it to be easily applied and at a trifling expense to planters of ordinary construction.

Having thus described my invention, what I claim is—

1. A seed-guiding attachment for corn-planters, consisting of a ring or annular guide adapted to be mounted within the hopper or seed-box, and suitable brackets for supporting the same without contact with the walls of the seed-box, substantially as set forth.

2. A seed-guiding attachment for corn-planters, consisting of a ring or circular guide adapted to be supported within the hopper or seed-box and provided in its under side with an annular recess or concavity, substantially as and for the purpose set forth.

3. In a corn-planter, the combination, with the hopper, the bottom of which is provided with a circular series of perforations, of a ring or annular guide having a recess or concavity in its under side, and brackets mounted upon the bottom of the seed-box and supporting the said guide-ring, substantially as and for the purpose set forth.

4. The combination, with a seed-box or hopper having an annular guide-ring suitably supported within the same, of a bell or sounder suspended under the lid of said seed-box and adapted to engage said guide-ring, substantially as set forth.

5. The combination, with the hopper, of the brackets mounted upon the bottom of the same, a ring or annular guide supported upon said brackets and having an annular recess or concavity in its under side, a chain secured to the under side of the lid, and a bell suspended by said chain and adapted to engage the annular guide, substantially as set forth.

In testimony that I claim the foregoing as my own I have hereto affixed my signature in presence of two witnesses.

CHARLES O. PARKHURST.

Witnesses:
JAMES QUICK,
HORACE A. WRIGHT.